US006143202A

United States Patent [19]

Christensen et al.

[11] Patent Number: 6,143,202

[45] Date of Patent: Nov. 7, 2000

[54] PROCESS FOR THE AUTOTHERMAL STEAM REFORMING OF A HYDROCARBON FEEDSTOCK

[75] Inventors: Peter Seier Christensen, Copenhagen; Thomas Sandahl Christensen, Lyngby; Ivar Ivarsen Primdahl, Copenhagen, all of Denmark

[73] Assignee: Haldor Topsoe A/S, Copenhagen, Denmark

[21] Appl. No.: 09/251,116

[22] Filed: Feb. 16, 1999

[30] Foreign Application Priority Data

Feb. 17, 1998 [DK] Denmark ................................ 0216/98

[51] Int. Cl.[7] ...................................................... C07C 1/02

[52] U.S. Cl. ............................................................ 252/373

[58] Field of Search .............................................. 252/373

[56] References Cited

U.S. PATENT DOCUMENTS

| | | | |
|---|---|---|---|
| 5,112,527 | 5/1992 | Kobylinski | 252/373 |
| 5,496,170 | 3/1996 | Primdahl et al. | 431/187 |

OTHER PUBLICATIONS

"Hydrocarbon Processing", Mar. 1994, vol. 73, No. 3.

*Primary Examiner*—Johann Richter
*Assistant Examiner*—J. Parsa
*Attorney, Agent, or Firm*—Ostrolenk, Faber, Gerb & Soffen, LLP

[57] ABSTRACT

Process for the soot free autothermal steam reforming of a hydrocarbon feedstock by autothermally reforming the feedstock in an autothermal reactor at a given temperature and a given steam to carbon ratio in the feedstock and operating at a pressure in the reactor being above a critical value, where no soot is present in the steam reformed feedstock.

5 Claims, No Drawings

PROCESS FOR THE AUTOTHERMAL STEAM REFORMING OF A HYDROCARBON FEEDSTOCK

BACKGROUND OF THE INVENTION

The present invention is directed to soot free autothermal reforming (ATR) of hydrocarbon feed.

In the autothermal reforming, combustion of hydrocarbon feed is carried out with substoichiometric amounts of oxygen by flame reactions in a burner combustion zone and, subsequently, steam reforming of the partially combusted feedstock in a fixed bed of steam reforming catalyst. Substoichiometric combustion of hydrocarbons leads disadvantageously to formation of soot. Soot formation may be avoided by using a specific burner design and through controlling the operating conditions of the ATR process. Soot is formed in the flame of an autothermal reactor within certain ranges of operating conditions. When the amount of steam relative to the other components send to the ATR reactor is under a critical value, soot is formed in the reacting feed. The design of the burner nozzles has influence on the critical steam to carbon ratio. One such burner useful in ATR is described in U.S. Pat. No. 5,496,170. The limiting amount of steam can be expressed as the critical steam to carbon ratio, which is the molar feed flow rate of steam to the molar flow rate of carbon in the hydrocarbon feed. The hydrocarbon feedstocks can be in form of natural gas or another kind of hydrocarbon including LPG, butane, naphtha, etc. The molar flow rate of carbon is calculated as the molar flow rate of the hydrocarbon times the carbon contents of the hydrocarbon.

Examples of operation conditions, which do not result in soot formation, are summarized in a paper by Christensen and Primdahl (Hydrocarbon Processing, March 1994, pages 39–46). Those conditions are shown in Table 1. The tests have been conducted in a pilot plant. Due to heat loss from the relatively small pilot unit, the adiabatic ATR exit temperature will be higher than the measured ATR exit temperature. This means that if a large unit, from which the heat loss is negligible, is subjected to the exact same operating conditions, the ATR exit temperature will be close to the adiabatic ATR exit temperature. The soot precursors are formed in the combustion zone of the ATR. Most of the heat loss occurs after the combustion zone. A subsequent heat loss cannot have any influence on the reactions in the combustion zone. The oxygen to carbon ratio ($O_2$/C) is also shown in Table 1. The definition of this ratio is analogue to the steam to carbon ratio, however, with steam substituted by oxygen. The exit temperature from the ATR reactor can be calculated from the $O_2$/C ratio, when the heat loss from the reactor is known.

TABLE 1

| Case No. | Oxygen to Carbon Ratio | $H_2O$/C | $CO_2$/C | Measured ATR Exit Temp.° C. | Adiabatic ATR Exit Temp.° C. |
|---|---|---|---|---|---|
| A | 0.60 | 1.43 | 0 | 950 | 1013 |
| B | 0.62 | 0.59 | 0 | 1065 | 1173 |
| C | 0.60 | 0.86 | 0 | 1000 | 1073 |
| D | 0.67 | 0.68 | 0.47 | 1018 | 1147 |
| E | 0.70 | 0.67 | 0.75 | 1030 | 1147 |
| F | 0.73 | 0.58 | 0.98 | 1028 | 1177 |

Operation conditions which do not result in soot formation (from Christensen and Primdahl, 1994)

Advantageously, the process is operated at low steam to carbon ratios, since a low ratio lowers the investment expenses for an ATR plant and reduces the necessary energy consumption in operating the plant. Additionally, a low steam to carbon ratio makes it possible to optimize the produced synthesis gas composition for production of CO-rich gases for e.g. methanol or dimethyl ether synthesis and Fischer-Tropsh processes.

It has been found that the operating pressure has a very strong influence of the critical steam to carbon ratio.

It has further been found that at a given temperature and steam to carbon ratio in the feedstock, the feedstock is autothermally reformed without formation of detrimental soot when adjusting the operation pressure in the autothermal reactor above a critical value.

DESCRIPTION OF THE INVENTION

Accordingly, this invention is a process for the soot free autothermal reforming of a hydrocarbon feedstock in an autothermal reactor at a given temperature and a given steam to carbon ratio in the feedstock and adjusting operation pressure in the reactor above a critical value, so that no soot is present in the steam reformed feedstock.

The critical steam to carbon ratio decreases when the operating pressure is increased. By means of the invention, the operating pressure in the ATR reactor is the critical parameter for suppressing soot formation. By increasing the operating pressure, it is possible to operate advantageously at a lower steam to carbon ratio.

The actual critical pressure will depend on the burner design used in the ATR reactor.

Preferably, the pressure is adjusted to meet the following relation between steam carbon ratio, temperature at exit of the reactor and pressure: $p \geqq 15.0-0.00914\ T_{exit}-1.92 \cdot S/C$ or at adiabatic conditions $p \geqq 13.4-0.00753 \cdot T_{adiabatic}-1.74\ S/C$, where p is the pressure in MPa, T is the gas temperature in K at exit of the reactor or at adiabatic conditions, respectively, S/C is the molar steam-to-carbon ratio in the feedgas.

The invention has been tested in the pressure range of 0.86–2.95 MPa. However, it is apparent from the following examples that the invention will be applicable at higher operating pressures.

EXAMPLE 1

The test unit consists of a system for providing the feeds to the ATR reactor, the ATR reactor itself, and equipment for posttreatment of the product gas.

The feed streams consist of natural gas, steam, oxygen and hydrogen. All gases are compressed to the operating pressure and preheated to the operating temperature. The natural gas is desulphurized before entering the ATR reactor. The feeds were combined into two streams and were send to the burner of the ATR. The burner used in the example is described in U.S. Pat. No. 5,496,170, which by reference is included herein. One feed stream contained natural gas, hydrogen and steam. This feed stream was heated to 500° C. The other feed stream contained oxygen and steam. This feed stream was heated to 220° C.

In the ATR reactor, the substoichiometric combustion and subsequent catalytic steam reforming and shift reactions are carried out. The inlet and exit gas compositions are measured by gaschromatography. The product gas is in equilibrium with respect to the reforming and shift reactions.

Downstream the ATR reactor, the process gas is cooled down and the majority of the steam content in the product gas is condensed. If soot is formed, it is captured in the condensate. The condensate was subjected to both gravemetric and spectrophotometric examinations.

The following tests were carried out to demonstrate the influence of operating pressure on the critical steam to carbon ratio. The hydrocarbon used was natural gas. The composition of the natural gas is given in Table 2.

TABLE 2

| Composition of Natural Gas | |
|---|---|
| Component | Mole Fraction % |
| $N_2$ | 0.45 |
| $CO_2$ | 1.20 |
| $CH_4$ | 95.36 |
| $C_2H_6$ | 2.22 |
| $C_3H_8$ | 0.45 |
| $C_4H_{10}$ | 0.23 |
| $C_5H_{12}$ and higher hydrocarbons | 0.08 |

Each test was made by approaching the critical steam to carbon ratio from the steam rich side. The tests were initiated with a sufficiently high steam flow to ensure soot free conditions. The steam flow was then decreased in steps which resulted in a decrease in the steam to carbon ratio of approximately 0.03. The system was allowed to become stable after which the condensate was examined for soot content. If the condensate was still soot free, the next step was taken. The term "soot free conditions" refers to condition in which the soot formation is negligible. The soot amount formed at the critical steam to carbon ratio was approximately 3–5 ppm.

The critical steam to carbon ratio as function of pressure measured at two different operating temperatures is given in Table 3. The flow rates were in all tests 100 $Nm^3/h$ natural gas and 3 $Nm^3/h$ hydrogen. 100 $Nm^3/h$ natural gas correspond to a carbon flow rate of 102.5 $Nm^3/h$. The steam flow was adjusted to obtain the given steam to carbon ratio. The oxygen flow rate was adjusted to obtain the desired operating temperature and varied in the range 55–62 $Nm^3/h$.

Due to heat loss from the relatively small pilot unit, the adiabatic ATR exit temperature will be higher than the temperature given in Table 2. A large industrial unit will be very close to adiabatic and the exit temperature from such a unit will, hence, be very close to the adiabatic given in Table 3 when the industrial unit otherwise is operated at exactly the same conditions as quoted in Table 3.

TABLE 3

| Test No. | Oxygen to Carbon Ratio | Pressure MPa | Measured ATR Exit Temp. ° C. | Adiabatic ATR Exit Temp. ° C. | Critical Steam to Carbon Ratio |
|---|---|---|---|---|---|
| 1.1 | 0.58 | 1.91 | 960 | 1041 | 0.96 |
| 1.2 | 0.57 | 2.16 | 960 | 1026 | 0.78 |
| 1.3 | 0.56 | 2.46 | 960 | 1039 | 0.62 |
| 1.4 | 0.54 | 2.75 | 960 | 1014 | 0.50 |
| 1.5 | 0.60 | 1.77 | 1035 | 1113 | 0.68 |
| 1.6 | 0.58 | 2.06 | 1035 | 1103 | 0.39 |
| 1.7 | 0.57 | 2.46 | 1035 | 1110 | 0.27 |
| 1.8 | 0.55 | 2.95 | 1035 | 1104 | 0.15 |

Critical steam to carbon ratio as function of pressure and operating temperature.

The composition of the product gas from the ATR reactor in the tests of Table 3 was measured by gaschromatography. Selected gas compositions are shown in Table 4. The gas composition is given as dry mole %, which is the mole composition of the gas components, when steam is not included.

TABLE 4

| | Composition of Product Gas (dry mole %) of the Tests of Table 3 | | | | |
|---|---|---|---|---|---|
| Test Number | $H_2$ % | $N_2$ % | CO % | $CO_2$ % | $CH_4$ % |
| 1.1 | 65.2 | 0.21 | 25.7 | 7.91 | 0.89 |
| 1.4 | 63.0 | 0.25 | 28.0 | 5.50 | 3.26 |
| 1.5 | 65.2 | 0.24 | 27.7 | 6.49 | 0.87 |
| 1.7 | 64.0 | 0.22 | 30.7 | 3.80 | 1.31 |

A very strong dependence of the critical steam to carbon ratio is seen for both operating temperatures. At an operating temperature of 1035° C., the critical steam to carbon ratio decreases by a factor 4.5, when the pressure is increased by less than a factor 2.

The data disclosed in Table 3 correlate with the relationship $p=15.0–0.00914\ T_{exit}–1.92\ S/C$, where T is the temperature at exit of the reactor in K and the pressure in MPa.

From the above equation it is calculated that at a pressure above 3.5 MPa and a temperature at exit of the reactor above 985° C., the critical steam to carbon ratio is zero. the data in Table 3 correlate with the relationship $p=13.4–0.00753 \cdot T_{adiabatic}–1.74\ S/C$, where T is the adiabatic exit temperature in K. From this equation it is calculated that at a pressure above 3.5 MPa and an adiabatic temperature above 1042° C., the critical steam to carbon ratio is zero.

What is claimed is:

1. Process for the soot free steam reforming of a hydrocarbon feedstock by autothermally reforming the feedstock in an autothermal reactor at a given temperature and a given steam to carbon ratio in the feedstock and operating at a pressure in the reactor above a critical value, where no soot is present in the steam reformed feedstock, said process further comprising the partial oxidation of the feedstock by burning at a substochiometric oxygen concentration;

which the operation pressure is adjusted to a value of $p \geqq 13.4–0.00753\ T_{adiabatic}–1.74\ S/C$, where p is the pressure in Mpa, T is the adiabatic as temperature in K of the reformed feedstock, and S/C is the molar steam-to-carbon ratio the feedstock.

2. Process according to claim 1, wherein the operation pressure is adjusted to a value of $p \geqq 15.0–0.00914\ T_{exit}–1.92 \cdot S/C$, where p is the pressure in MPa, T is the gas temperature in K of the reformed feedstock at outlet of the reactor, and S/C is the molar steam-to-carbon ratio in the feedstock.

3. Process according to claim 1, wherein the operating pressure is above 2.9 MPa.

4. Process according to claim 1, wherein the operating pressure is above 3.5 MPa.

5. Process according to claim 1, wherein the operating pressure is above 3.5 MPa and the adiabatic temperature of the autothermally reformed feedstock is above 1042° C. and steam to carbon ratio in the feedstock $\geqq 0$.

* * * * *